(12) United States Patent
Kobsa

(10) Patent No.: US 6,448,534 B1
(45) Date of Patent: Sep. 10, 2002

(54) METHOD AND APPARATUS FOR LASER CUTTING MATERIALS

(75) Inventor: Henry Kobsa, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 85 days.

(21) Appl. No.: 09/691,883

(22) Filed: Oct. 19, 2000

Related U.S. Application Data

(62) Division of application No. 09/269,494, filed on Apr. 24, 1998, now Pat. No. 6,163,010.

(30) Foreign Application Priority Data

Oct. 27, 1995 (DE) .......................... 95 11 695

(51) Int. Cl.$^7$ ............................................. B23K 26/38
(52) U.S. Cl. ................................................ 219/121.72
(58) Field of Search ....................... 219/121.61, 121.67, 219/121.68, 121.69, 121.7, 121.71, 121.72, 121.62, 121.84

(56) References Cited

U.S. PATENT DOCUMENTS

| | | | | |
|---|---|---|---|---|
| 3,597,578 A | * | 8/1971 | Sullivan et al. | 219/121.72 |
| 5,093,551 A | * | 3/1992 | Bishop | 219/121.72 |
| 5,168,143 A | * | 12/1992 | Kobsa et al. | 219/121.72 |
| 5,198,637 A | * | 3/1993 | Noda et al. | 219/121.69 |
| 5,811,751 A | * | 9/1998 | Leong et al. | 219/121.6 |
| 5,854,805 A | * | 12/1998 | Reid et al. | 372/70 |

FOREIGN PATENT DOCUMENTS

JP 358020390 A * 2/1983 ............. 219/121.72

* cited by examiner

Primary Examiner—Samuel M. Heinrich

(57) ABSTRACT

An improved method and apparatus of cutting an object with a laser beam, comprising using a diode laser-pumped pulsed solid state laser having an average power output from about 2 to about 100 watts and delivering an average laser beam brightness of greater than $10^{12}$ W/m$^2$*sr and a peak brightness of greater than $10^{13}$ W/m$^2$*sr to the object. Objects cut with the laser cutting method having heat affected zones (HAZ) of less than 4 mm, and having substantially no microcracks.

7 Claims, 4 Drawing Sheets

METHOD AND APPARATUS FOR LASER CUTTING MATERIALS

This is a division of application Ser. No. 09/269,494 filed Apr. 24, 1998, now Allowed was U.S. Pat. No. 6,163,010.

BACKGROUND OF THE INVENTION

1. Field of the Invention

The present invention relates to a method for laser cutting a manufactured object by means of a focused high energy laser beam, a system for precision processing and machining of materials, and manufactured objects having been cut by this method.

2. Description of the Related Art

The method of cutting manufactured objects by means of a focused laser beam is in general known in the art. Most commercial systems use a fiber optic bundle to deliver the beam to the cutting station. However, the use of fiber optics is totally unsuitable for precision cutting since the fiber optics very badly degrade the beam quality. A beam quality factor $M^2$ (as defined below) for a fiber delivered beam is typically in the 50 to 150 range whereas a beam quality factor $M^2$ of less than 2 is needed for precision cutting. Since $M^2$ enters the equation for brightness (as defined below) as its square in the denominator, fiber coupled lasers fail the necessary brightness by orders of magnitude.

Only a few references discuss using a laser beam directly for cutting. Typical is Johnson et al., U.S. Pat. No. 5,057,664, which describes the use of a diode pumped, Q-switched YAG laser for cutting very thin (about 1 mm or less) films of materials having a high melting point, such as nichrome or tantalum nitride, as used for thin-film resistors. They report a trim profile with a good smoothness.

Basu et al., U.S. Pat. No. 4,890,289, describe a high energy diode pumped solid state laser arrangement applicable, e.g., for laser cutting. To avoid distortion of the laser gain material by heat generated together with the radiation, they propose to arrange the pumping diodes in a certain distance from the laser material, to guide and concentrate the pumping radiation by means of fiber optics, and to cyclically move the pumped region to distribute the heat generated in the laser by the optical pumping radiation. Such an arrangement needs obviously rather sophisticated mechanical and control means. Further, a slab laser, such as disclosed in Basu et al. is less preferred than a rod laser for precision cutting since a slab laser typically exhibits astigmatism which also prevents the beam quality factor $M^2$ from being in the desired range.

Baer, U.S. Pat. 5,059,764, employs an end-pumped, fiber coupled, solid state rod laser pumped by laser diodes, for application to semiconductor manufacture and repair. The beam width in this device can be as low as 1–2 mm, and the pulses have typically an energy of 30 mJ. Single pulses are employed to ablate undesired links in semiconductor circuits.

The methods of Johnson et al. and Baer described above are useful for shaping of rather thin objects like metal layers in semiconductor circuits and the material is removed mainly by ablation. The method of Basu et al. is generally suitable for thicker materials but can only make relatively coarse cuts, i.e., about ten times wider than desirable. There remains a need for a method to make precision microcuts in thicker manufactured objects, i. e., of cuts having a high aspect ratio L/D between material thickness L and cut width D. Kobsa et al., U.S. Pat. No. 5,168,143, have employed a laser beam to cut complex capillaries in spinneret plates. Such plates are typically of metal and are 0.2 to 1.0 mm thick, although they can be as thin as 0.1 mm or as thick as 2.0 mm. In this process the focused laser energy creates a pool of molten material between the face (upper) and the bottom (lower) surface of the plate and the molten metal is expelled by means of a pressurized fluid flowing coaxially with the laser beam. The laser beam is substantially a single-mode beam and is focused to a spot size of less than 100 mm on a location above the upper surface of the plate. The laser is preferably pumped with xenon flash tubes and operated at a repetition frequency between 100 and 200 Hz. By this method, cuts about 40 mm wide and with satisfactory smooth edges could be made in metal and ceramic plates of some 0.2 to 1.3 mm thickness.

Specific to this method is the occurrence of a heat affected zone (HAZ) at the surface of the kerf. This may be caused by molten material which was not removed by the fluid jet but solidified due to heat dissipation in the manufactured object by recrystallization, or by the occurrence of cracks due to thermal stress or by other effects. The thickness of the HAZ created by known methods of laser cutting depends on material being cut and by process parameters and is typically 25 to 50 mm. Generally the material in the HAZ has different physical and chemical properties than the bulk material. Thus it may happen that when the manufactured object is in use the heat affected zone is less resistant to mechanical wear and/or to chemical attack than the bulk material and the dimension of the cut region may change rapidly when in use. This is obviously a disadvantage.

Therefore it is the object of the present invention to improve the laser cutting process in such manner that the thickness of the heat affected zone in a laser cut object is significantly less than that achieved by the prior art.

SUMMMARY OP THE INVENTION

According to the invention there is provided a method for cutting through a manufactured object with a thickness of about 0.1 to 2.0 mm that includes the steps of using a laser having side-pumped diode bars, which has an average power output from about 2 to about 100 watts and delivers an average laser beam brightness of greater than $10^{12}$ W/m$^2$*sr and a peak brightness of more than $10^{13}$ W/m$^2$*sr to produce a laser beam. The laser beam is focused to a plane between the upper and the lower surface of the object, which either melts or vaporizes the material. The melted or vaporized material is expelled by the laser beam from the object by a pressurized fluid flowing coaxially with the laser beam.

The invention also comprises a laser based system for precision processing and machining of materials and workpieces. This system comprises a solid state laser light source comprising a laser medium, preferably a cylindrical rod of neodymium-doped yttrium aluminum garnet (Nd:YAG), a laser cavity defined by two end mirrors, a multiplicity of diode bars arranged around the laser medium for pumping it, and optical elements for improving the beam quality. Such optical elements are generally known and may be apertures for selecting single modes (e. g. the TEMoo mode), lenses, or curved mirrors. The system further comprises a lens system for expanding, collimating, and focusing the laser beam. The focusing lens may be located close to the collimator or at some distance to leave space for other parts of the system, like beam attenuators or beam splitters for beam diagnostic. The system further comprises a workstation for holding and moving a workpiece with respect to the laser beam. This workstation holds the workpiece, e. g., by clamping elements, and has means to independently move the workpiece in two orthogonal directions and to independently move the focus point of the laser in a third direction, orthogonal to the first two directions.

DETAILED DESCRIPTION OF THE FIGURES

Figure 1:
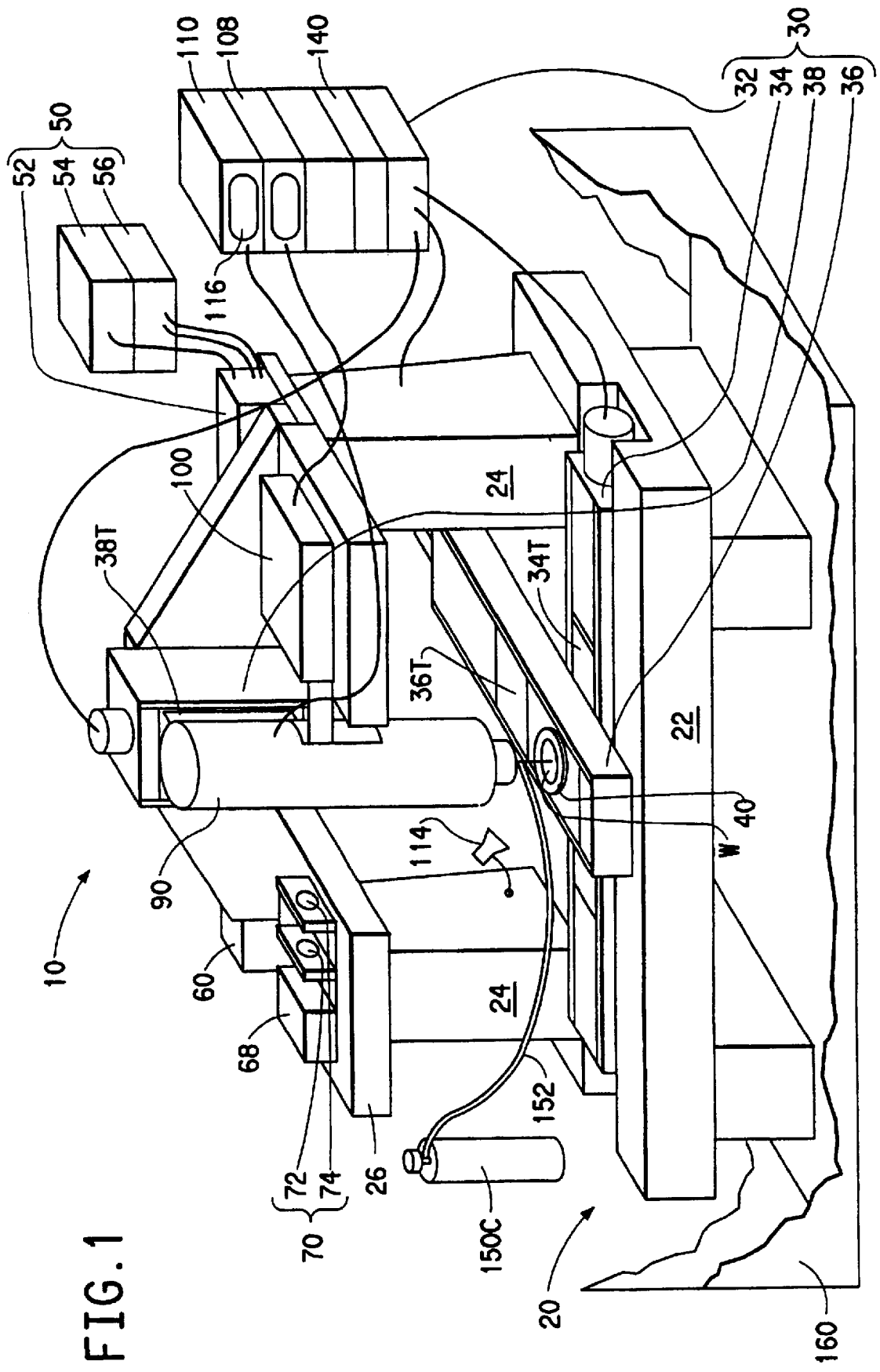
FIG. 1 is a pictorial view showing the apparatus of the present invention.

The average brightness of a laser $B_{av}$ depends on the laser power, and on the cross section as well as on the solid angle of the laser beam in its focal plane. It is here defined for a pulsed laser by the following formula:

$$B_{av}=(n^*E)/(A^*Q)[W/m^{2*}sr], \text{ where}$$

E[J]=energy per pulse,
n[1/s]=repetition rate,
A[m$^2$]=cross section of the beam in the focal plane,
Q[sr]=solid angle encircled by the beam at the waist
Q[sr]=solid angle encircled by the beam at the waist
For a CW laser, n*E has to be replaced by the power in [W].
In units which can be measured easier this becomes $$B_{av}=(4/p)^{2*}(n^*E)/(W_o^{2*}q^2)[W/m^{2*}sr],$$

where
$W_o$[m]=diameter of the beam at the waist,
q[rad]=divergence of the laser beam.
The divergence q can be determined as the ratio between the diameter of the collimated beam before entering the focusing lens and the focal length of this lens.

Since $W_o$ is more conveniently measured in mm, this becomes $$B_{av}=10^{12*}(4/p)^{2*}(n^*E)/(W_o^{2*}q^2)[W/m^{2*}sr].$$

The peak brightness is obtained when dividing $B_{av}$ by the duty cycle r:

$$B_p=B_{av}/r[W/m^{2*}sr].$$

The duty cycle means e. g. for equal and essentially rectangular laser pulses the ratio of the duration of a laser pulse to the time interval between start of one pulse and start of the next.

It follows that in order to obtain a high brightness one has either to increase the pulse energy E or to decrease the product $W_o^*q$ which describes the beam quality, or both. The minimum value for $W_o^*q$ is equal to the diffraction limit 4l/p, where l is the wavelength of the laser radiation. For further discussion a beam quality factor $M^2$ is used, which is the ratio between the actual and the minimum value of ($W_o^*q$) and is defined in the equation:

$$W_o^*q=M^{2*}4^*l/p.[m^*rad]$$

Using this we get for the average brightness $$B_{av}=(n^*E)/(l^{2*}(M^2)^2)=0.883^*10^{12*}n^*E/(M^2)^2[W/m^{2*}sr]$$

for the Nd:YAG laser with l=1.064 mm.

This means that in order to obtain high brightness for a laser, the beam quality factor $M^2$ must be as low as possible. The apparatus of the present invention controls $M^2$ by: (1) correcting thermal lensing by either using one or more lenses inside the laser cavity or using one or two curved end mirrors; and (2) minimizing thermal loading of the laser medium to avoid higher order distortions such as astigmatism, which are difficult or impossible to correct, as will be explained below.

The apparatus of the present invention is shown generally at 10. Apparatus 10 comprises a vibration-free support structure 20, a three-axis positioning system 30, a workpiece holding fixture 40, a laser system 50, a laser beam attenuator 60, a laser beam expander 70, a beam sampler 80, a laser beam delivery assembly 90, a laser beam quality monitor 100, a cutting zone viewing system 110, a capacitive distance sensor 140, a pressurized-gas cutting assist unit 150, and a light-tight safety enclosure 160.

Figure 4:
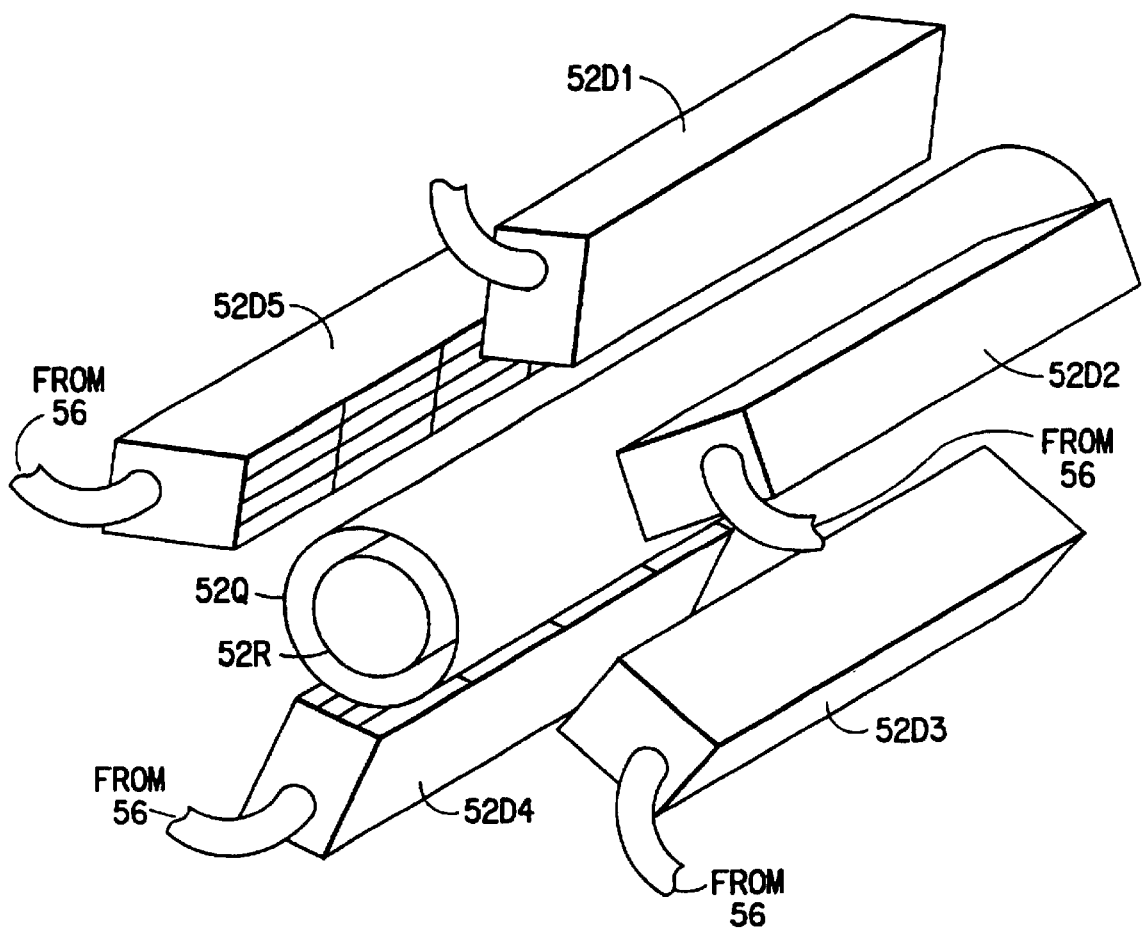
FIG. 4 is a perspective view of the laser rod and pumping diodes, showing a preferred arrangement for optically pumping the laser rod.

The laser cutting system 50 is based on a laser diode-pumped pulsed Nd:YAG solid state laser head 52. A laser system 50 includes a laser cavity defined by two end mirrors, a laser medium, a multiplicity of diode bars for pumping the laser medium, and at least one optical element for improving the beam quality. A laser system manufactured by Fibertek, Inc. of Herndon, Va. as model 3621-3000-1 comprises a laser head 52, power supply 54 and thermal cooling unit 56. The laser medium, comprising a laser rod 52R in the laser head, is pumped by eighty (80) laser diode bars of 50 W each. These diode bars are arranged in five arrays, 52D1 through 52D5, of 4 by 4 alongside the perimeter of the laser rod. FIG. 4 illustrates this arrangement. The average laser power may be from about 2 watts to about 100 watts, preferably about 30 watts. The pulse length is 150 micro seconds [ms] and the pulse repetition rate is 1000 pulses per second [1/s] which corresponds to a duty cycle of 0.15. The diodes 52D and the laser rod 52R are chilled by a water-to-air cooling unit 56.

It is important that the temperature distribution in the laser medium be as symmetrical as possible. This is often easier to accomplish in a cylindrical rod shaped laser medium, because of its symmetry, than in a slab shaped laser medium. In the most preferred embodiment of the invention, as seen in FIG. 5, a rod laser medium is side-pumped by a number (such as five) of arrays of laser diode bars, to achieve a uniform temperature distribution which will vary radially but varies as little as possible circumferentially. The cylindrical rod 52R is preferably enclosed in a transparent quartz tube 52Q through which a temperature controlled coolant, such as deionized water supplied by a cooling unit 56, flows at a constant rate to maintain the laser rod 52R at a constant average temperature. The bars that hold the pumping laser diodes 52D are made of a heat sink material having a high thermal conductivity through which the temperature controlled coolant from the cooling unit 56 flows at a constant rate to maintain the pumping laser diodes at a constant average temperature. To get a high pulse energy, it is preferred in the method according to the invention to use a side-pumped laser rod 52R with the pumping laser diodes 52D directly coupled to the laser rod 52R for maximum optical pumping efficiency.

Particularly preferred is a cylindrical rod shaped laser medium. An array of pumping diodes is arranged close to the laser medium. The pumping diodes are preferably disposed around the perimeter of the laser medium. This way a greater number of diodes, e.g., 20 to 160, can be arranged close to the laser medium, each having an output pumping radiation power of 20 watts to 100 watts so that a pumping power of several kilowatts can be achieved. At the same time the pumping energy is more uniformly distributed over the laser medium and thermal stress is lower. For best thermal uniformity within the laser rod an arrangement having an odd number, such as five or seven, of diode bar array lines symmetrically arranged around the laser rod is preferred. An odd number is preferred so that optical energy from one diode bar array line that is not absorbed by the laser rod does not impinge upon an opposite diode bar array line. With the present invention, a beam quality factor of $M^2=1.2$ is obtained by using one or more curved end mirror and by side-pumping the laser medium.

Figure 2:
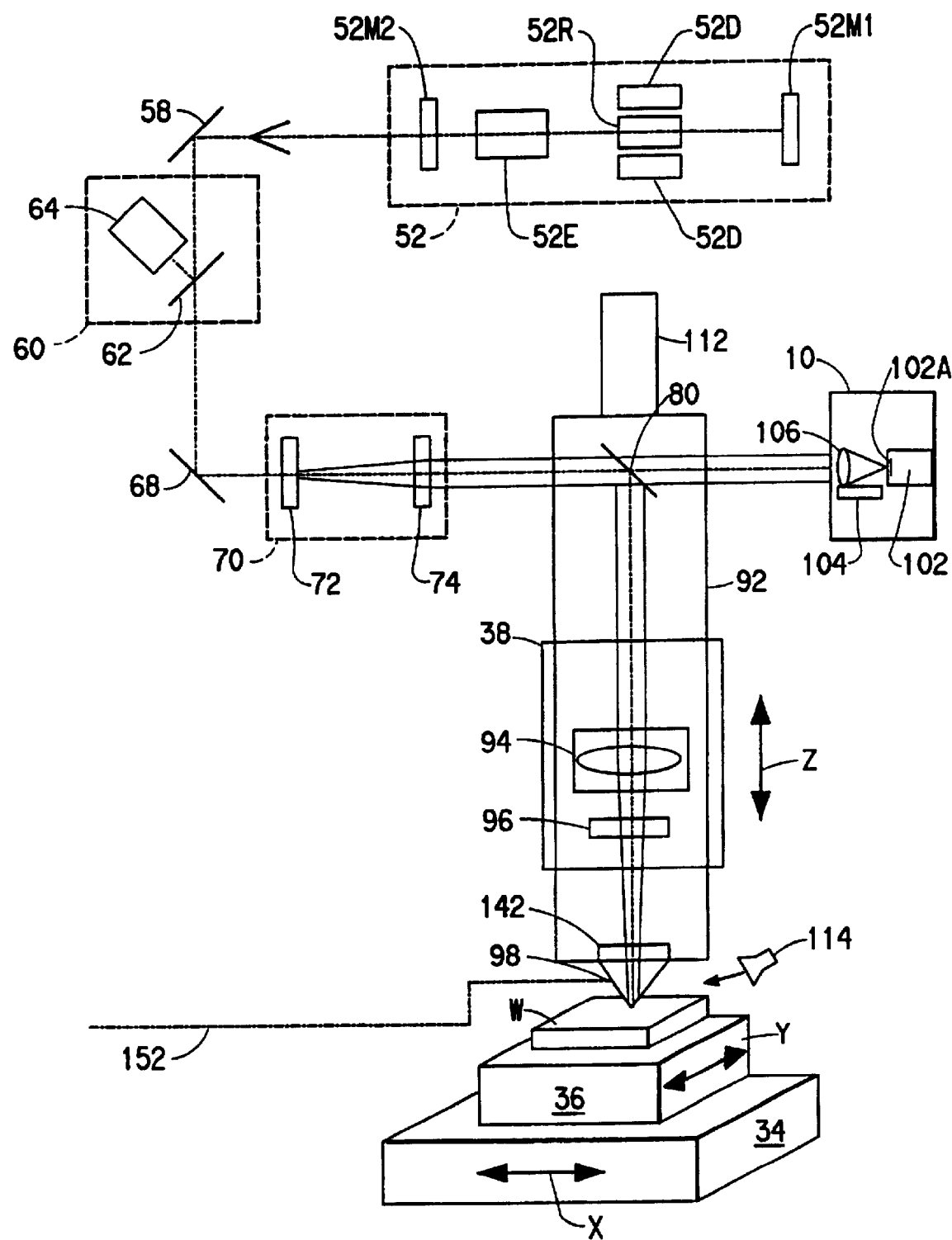
FIG. 2 is a stylized diagrammatic view of the optical elements of the invention.
Figure 3:
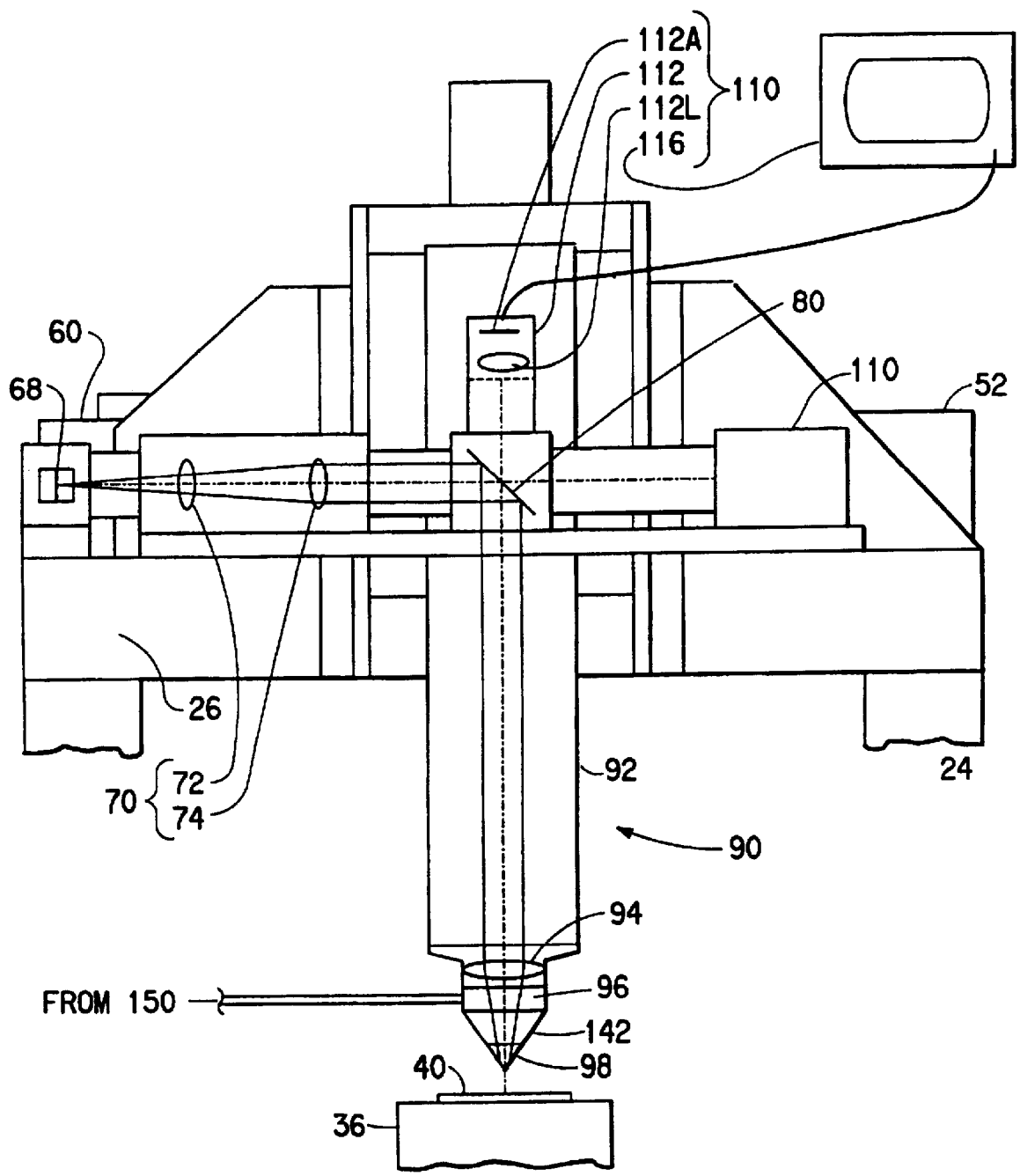
FIG. 3 is a elevational view, partly in section, showing the laser beam delivery assembly.

The beam attenuator 60 may be, e. g., a grey (neutral density) filter of varying density, also known as a wedge filter, or a partially reflective mirror (partially reflective beam splitter) of varying reflectivity 62, as shown in FIG. 2, which can be moved in a direction essentially perpendicular to the optical path. Reflected laser energy is absorbed by beam dump 64. Particularly preferred as the attenuator 60 is a diffractive laser beam attenuator, also known as a diffractive beam splitter. It is also advantageous if the beam splitter is continuously variable over a wide attenuation range so that the beam power may be selected over this range to accommodate the material being cut. A suitable attenuator is an Optical Power Modulator model OPM 121-45021 sold by Gentec Inc., Saint-Foy, Quebec, Canada.

The beam attenuator can conveniently be located at any place between the outcoupling mirror 52M2 of the laser head 52 and the final focusing lens 94. For example, it can be located immediately after the corner mirror 58 as illustrated in FIGS. 1 and 2 or be inserted into the lens system after the beam has been expanded and collimated.

The beam passes through a beam attenuator 60 as described above. Then it goes through a beam expanding lens 72 which, dependent on the application, expands the beam to a diameter of 5 to 20 mm and a beam collimating lens 74 which collimates the beam. Next a beam sampler 80, comprising a beam splitter mirror, separates about 0.1% of the beam to the laser beam quality monitor 100 for beam diagnosis and reflects 99.9% of the beam to the laser beam delivery assembly 90 which focuses the beam at the cutting station. The beam sampler 80 is transparent to visible light to allow monitoring of the cutting process as described in conjunction with cutting zone viewing system 110. The portion of the beam detected by the CCD camera 102 of the laser beam quality monitor 100 generates an on-line picture of the laser beam contour which is displayed on a monitor 109 for visually monitoring beam quality by the operator. The focusing lens 94 of the laser beam delivery assembly 90 has a focal length of eighty millimeters (80 mm). The nozzle 98, which is mounted on laser beam delivery assembly 90, directs a jet of a fluid coaxial with the laser beam at the surface of the workpiece, similar to Kobsa, U.S. Pat. No. 5,168,143. Preferred fluids in the pressurized-gas cutting assist unit 150 for cutting are oxygen, nitrogen, carbon dioxide, and argon, the pressure of which can be controlled to achieve optimum cutting quality and can, for example be about 0.5 MPa. The support structure 20 is preferably made of granite rock, or similar material, such as a unit available from Thyssen Laser-Technik GmbH, to reduce vibration and to maintain proper alignment of the optics.

The three-axis positioning system 30 comprises a controller 32, an X-axis positioning stage 34, a Y-axis positioning stage 36, and a Z-axis positioning stage 38. Each positioning stage 34, 36, 38 has a respective moveable table 34T, 36T, 38T. The laser system 50 comprises a laser head 52, a laser power supply 54 and a laser cooling unit 56. The laser beam expander 70 comprises a beam expanding lens 72 and beam collimating lens 74. The laser beam delivery assembly 90 comprises a beam delivery tube 92, an objective or focusing lens 94, a window 96, and a nozzle 98.

The laser beam quality monitor 100 comprises a beam imaging CCD camera assembly 102 having a focus control unit 104 and an image processor/control unit 108. The small portion of the laser beam energy passing through beam sampler 80 passes through the focus control unit 104 and is focused onto a planar CCD array 102A of the beam imaging CCD camera assembly 102. The image processor/control unit 108 controls the focus control unit 104 to position a focusing lens 106 at several specific positions. A first position of lens 106 corresponds to focusing the beam exactly onto the CCD array 102A, a second position of lens 106 corresponds to focusing the beam at a position a small distance from the plane of CCD array 102A, a third position of lens 106 corresponds to focusing the beam at a position a larger distance from the plane of CCD array 102A. The images generated at these varying focal positions are received by the image processor/control unit 108, which in turn calculates the beam quality factor $M^2$, in accordance with the method published in Chapters 3 and 4 of Herziger and Loosen, *Werkstoffhearbeituna mit Laserstrahlung*. Carl Hanser Verlag, Munchen, 1993.

The cutting zone viewing system 110 comprises a CCD camera assembly 112, an auxiliary light source 114, and an image display unit 116. The cutting zone viewing system 110 is mounted on the Z-axis positioning stage 38 adjacent to the laser beam delivery assembly 90. Light reflecting from the cutting zone on the workpiece, either from the laser beam or from the auxiliary light source 114, is collimated by the objective lens 94 and passes through beam sampler 80. A lens 112L in camera assembly 112 focuses an image of the cutting zone onto a CCD imaging array 112A in the camera 112.

The support structure 20 comprises a base 22, upon which are mounted two support columns 24 upon which is mounted an upper platform 26. The workpiece holding fixture 40 is mounted on the Y-axis positioning stage 36, which is in turn mounted on the X-axis positioning stage 34, which in turn is mounted on base 22 of support structure 20. The laser head 52, the corner mirror 58, the laser beam attenuator 60, the corner mirror 68, the laser beam expander 70, and the Z-axis positioning stage 38 are mounted on upper platform 26. The laser beam delivery assembly 90 is mounted on the Z-axis positioning stage 38.

Suitable for use as the three axis positioning subsystem 30 is a commercial unit available from Aerotech, Inc. of Pittsburgh, Pa. comprising a model UNIDEX(R) model 31 series controller 32, a model ATS 50060 positioning stage which serves a X-axis stage 34, a model ATS 50060 positioning stage which serves as Y-axis stage 36, and a model ATS 50060 positioning stage which serves a Z-axis stage 38.

The capacitive distance sensor 140 comprises a distance sensing element 142 and a control module 144. The output of module 144 is connected via a cable 146 to controller 32. Distance sensor 140 measures the distance from the objective focusing lens 116 to the surface of the workpiece. Sensing element 142 may be mounted on nozzle 98. In operation the control module 144 sends an electrical signal representative of the objective lens to workpiece distance and the controller 32 sends a control signal to the Z-axis stage 38 to position the stage table 38T and thus the laser beam delivery assembly 90 to maintain the desired distance from the surface of the workpiece and thus to cause objective lens 94 to focus the laser beam at the desired position with respect to the surface of the workpiece.

A gas cutting assist unit 150, comprising a source 150C of gas, a supply tube 152 and a cutting nozzle 98, mounted in coaxial alignment with the laser beam between the focusing lens 94 and the workpiece W, directs a jet of a pressurized fluid to the surface of the workpiece held in the workstation. This fluid is preferably a gas like oxygen, argon, carbon dioxide, or nitrogen.

Further in accordance with the present invention, there is provided a method for cutting an object with a thickness of about 0.1 to 2.0 mm. The method includes the steps of using a laser having side-pumped diode bars, which has an average power output from about 2 to about 100 watts and delivers an average laser beam brightness of greater than $10^{12}$W/m$^2$*sr and a peak brightness of more than $10^{13}$W/m$^2$*sr to produce a laser beam. The laser beam is focused to a plane between the upper and the lower surface of the object, which either melts or vaporizes the material. The melted or vaporized material is expelled by the laser beam from the object by a pressurized fluid flowing coaxially with the laser beam.

Pulsed lasers are preferred in the method according to the invention because they permit achieving a very high peak brightness without excessive thermal load on the system. It is further preferred to operate the laser cutting equipment with a repetition frequency n of at least 500 pulses per second [1/s].

Further preferred in the method according to the invention is to operate the laser 50 at a constant average power output so that optimum beam quality may be maintained and to modulate the intensity of the laser beam by an attenuator 60 which is arranged in the optical path between the laser head 52 and the workpiece W, preferably immediately after the laser head 52. Thus the laser runs at a constant average power level and the effective average power of the laser beam at the workpiece is adjusted by the attenuator 60 to the level desired for the specific application. It is generally advantageous to adjust the power of the laser beam at the workpiece to a level just sufficient to achieve laser cutting. The use of an excessive power level increases the heat affected zone. This means that the unavoidable thermal lensing in the laser medium which is caused by the radial non-uniformity of refractive index within the medium, which again is caused by the radial temperature gradient, can be held constant and can be effectively corrected by an appropriate design of the resonator cavity, or by the use of an optical correcting element 52E as is illustrated in FIG. 2.

Further preferred is to monitor the distance between the focusing lens 94 and the surface of the workpiece W and to control this distance to a constant value. Thus the influence of unevenness or bends in the workpiece can be eliminated and the laser beam focal point can be maintained at the desired position relative to the surface of the workpiece. Such control is preferably achieved by a distance sensor system 140, such as a Lasermatic® II, available from Precitec GmbH of Gaggenau, Germany, which has a capacitive sensor 142 mounted on the laser beam delivery tube 92, which provides an electrical signal to the control unit 32 of a suitable three-coordinate workstation 30, which in turn maintains the laser beam focal point at the desired position relative to the surface of the workpiece.

When cutting thick objects it must be kept in mind that the minimum cross section area of the beam and therefore the highest fluence or brightness is limited to just one plane. Over and under this plane the beam is wider as a consequence of the focusing optics. This is described by the so called Rayleigh length $Z_r$ which is the distance over which the beam diverges to twice its minimum area (at the waist) and is given by ti $Z_r = Wo^2 * p/(M^2 * l) = 4W_o/q$, where $Z_r$, $W_o$, and l are measured in the same units. Typically, material up to about two $Z_r$ thick or slightly thicker can be cut with good quality. That means that $Z_r$ is preferably greater than 0.4 times the material thickness.

The Rayleigh length $Z_r$ can be controlled by selecting the appropriate beam expander. Expanding the beam more gives a smaller beam waist $W_o$, i.e., a smaller divergence q but also a smaller Rayleigh length $Z_r$. On the other hand, the smaller the beam diameter at the waist $W_o$ is, the narrower can be the cutting kerf. When cutting material about two $Z_r$ thick, the achievable kerf width is about 1.4 times $W_o$. In practice, the achievable kerf width is slightly larger than this value, depending upon the thermal conductivity of the material being cut.

The cutting method according to the invention can be applied to a variety of materials. Preferred are metals like stainless steel, copper, aluminum, even high melting point metals like tungsten, and ceramic materials like alumina (e.g. KERAMTEC® 708of Hoechst), silicon carbide, or zirconia. Also composite materials like carbon fiber reinforced thermosetting resins, carbon fiber reinforced carbon, or clad materials like stainless steel coated with a ceramic layer can be cut.

It was found that the cutting surfaces obtained by the method of the present invention were very smooth and had a very thin HAZ, typically not thicker than 4 mm. This is due to the very low value of $M^2$ for the laser cutting equipment according to the invention and to adjusting the effective power per pulse to a level which is just adequate for cutting but does not deposit excess energy on the workpiece. When cutting brittle materials like ceramics it was found that, contrary to the results with prior art methods, there were substantially no microcracks present in the cut surface.

The method of the present invention can be applied in different technical fields, e.g., for precision cutting of metal sheets in the automobile industry, in the manufacturing of precision ceramic parts for the electrical and electronics industry, of spinneret plates for the fibers industry, and of fuel injection nozzles, such as for diesel engines.

An optical path is defined in the system which extends from the laser head to the workpiece. Optical elements like mirrors, lenses, or beam splitters can be present in the optical path as usual in the art.

It was found that this laser system could be arranged in a relatively small enclosure because of the compact structure of the diode side-pumped laser and the moderate power consumed. Therefore it is preferred to enclose the system in an outer housing, the doors of which are interlocked with the laser power supply. This setup can then be treated as a Class I laser system in accordance with recognized laser safety standards.

A 0.5 mm thick sheet of stainless steel was cut with the device described above at a cutting speed of 3 m/min and at the full average laser power of n*E=30 watts. The beam quality $M^2$ as defined above was found to be 1.2. The peak brightness in this experiment calculated as described above was $B_p = 12.3 * 10^{13}$[W/m$^2$*sr] and the average brightness was $B_{av} = 18.4 * 10^{12}$[W/m$^2$*sr].

In a second experiment, a stainless steel sheet 0.2 mm thick was cut at a rate of 0.2 m/min. By visually observing the cutting process on monitor 116 and setting the attenuator 60 to the power just sufficient for cutting, the average laser power applied was n*E=2.5 watts. The beam quality was unchanged from that of Example 1, i.e., the beam quality factor $M^2$ was equal to 1.2. The brightness applied in this experiment was $B_p=1.03*10^{13} [W/m^2*sr]$ and $B_{av}=1.53*10^{12} [W/m^2*sr]$).

The width of the HAZ was measured by a metallographic technique (polishing and etching) and was found to be 2 mm for the material cut in both Examples 1 and 2. In further tests it was found that the beam quality factor was also maintained at intermediate cutting speed and at an average laser power such as 10 watts.

In comparison to these results, the prior art method described by Kobsa, U.S. Pat. 5,168,143, with n*E=11 W, $W_o$=42 mm, and q=80 mrad, which corresponds to an average brightness of $B_{av}=0.4*10^{12}[W/m^2*sr]$, gave a HAZ significantly thicker than 5 mm, i.e., up to about 25 mm.

What is claimed is:

1. A method for cutting a manufactured object with a thickness of about 0.1 to 2.0 mm that includes the steps of (a) using a laser having a cylindrical laser rod directly side-pumped by a plurality of arrays of laser diodes, wherein the laser has an average power output from about 2 to about 100 watts and delivers an average laser beam brightness of greater than $10^{12}$ W/m$^2$*sr and a peak brightness of more than $10^{13}$ W/m$^2$*sr to produce a laser beam;

(b) focusing the laser beam to a plane between the upper and the lower surface of the object, to melts or vaporizes the material;

(c) expelling the melted or vaporized material by the laser beam from the object by a pressurized fluid flowing coaxially with the laser beam.

2. The method of claim 1, wherein the laser has an $M^2$ beam quality factor of less than 2.

3. The method of claim 1, wherein the laser has an $M^2$ beam quality factor of less than 1.5.

4. The method of claim 2, wherein the laser output is held at a constant average power such that the $M^2$ beam quality factor of less than 2.0 is maintained and wherein the laser beam intensity is modulated by an attenuator disposed in the optical path between the laser and the object to a level just sufficient to achieve laser cutting of the object, so that the heat affected zone in the object is minimized.

5. The method of claim 1, wherein the distance between the focusing lens of the laser beam and the surface of the material is controlled automatically.

6. The method of claim 1, wherein the Rayleigh length of the laser beam is greater than about 0.4 times the thickness of the material being cut.

7. The method of claim 1, wherein the repetition rate of the laser is greater than 500 Hz.

* * * * *